US012668132B2

(12) United States Patent
Zemann et al.

(10) Patent No.: US 12,668,132 B2
(45) Date of Patent: Jun. 30, 2026

(54) ROCKER FOR A CURRENT COLLECTOR OF A VEHICLE

(71) Applicant: Siemens Mobility Austria GmbH, Vienna (AT)

(72) Inventors: Richard Zemann, Korneuburg (AT); Walter Reichardt, Breitenbrunn (AT); Christian Saliger, Vienna (AT)

(73) Assignee: Siemens Mobility Austria GmbH, Vienna (AT)

( * ) Notice: Subject to any disclaimer, the term of this patent is extended or adjusted under 35 U.S.C. 154(b) by 944 days.

(21) Appl. No.: 17/785,485

(22) PCT Filed: Dec. 11, 2020

(86) PCT No.: PCT/EP2020/085765
§ 371 (c)(1),
(2) Date: Jun. 15, 2022

(87) PCT Pub. No.: WO2021/122375
PCT Pub. Date: Jun. 24, 2021

(65) Prior Publication Data
US 2023/0023500 A1 Jan. 26, 2023

(30) Foreign Application Priority Data
Dec. 17, 2019 (AT) .................................. 51102/2019

(51) Int. Cl.
*B60L 5/24* (2006.01)
*B60L 5/28* (2006.01)
(52) U.S. Cl.
CPC ................... *B60L 5/24* (2013.01); *B60L 5/28* (2013.01); *B60L 2200/26* (2013.01)
(58) Field of Classification Search
CPC .......... B60L 5/24; B60L 5/28; B60L 2200/26
See application file for complete search history.

(56) References Cited

U.S. PATENT DOCUMENTS 6,591,953 B2 * 7/2003 Blanvillain ............... B60L 5/22
191/59
9,539,905 B2 * 1/2017 Wang ........................ B60L 5/18
(Continued)

FOREIGN PATENT DOCUMENTS

CN 2435270 6/2001
CN 2435270 Y * 6/2001
(Continued)

OTHER PUBLICATIONS

PCT International Search Report dated Mar. 24, 2021 based on PCT/EP2020/085765 filed Dec. 11, 2020.

*Primary Examiner* — Jason C Smith
(74) *Attorney, Agent, or Firm* — Cozen O'Connor

(57) ABSTRACT

A rocker for a current collector of a vehicle includes at least one first contact strip connected to a first lever arrangement which is coupled to a first bearing device, and connected to a second lever arrangement which is coupled to a second bearing device, wherein the first bearing device and the second bearing device are connectable in an articulated manner to a current collector linkage, where a first torsion spring is fixedly connected to a lever of the first lever arrangement and non-rotatably via a displaceable bearing to the first bearing device or is connected non-rotatably via a displaceable bearing to a lever of the first lever arrangement and fixedly to the first bearing device, where the first torsion spring simultaneously forms a torque transmission device and a spring device such that a lightweight, compact and nevertheless robust arrangement for collecting current is thereby obtained.

20 Claims, 2 Drawing Sheets

(56)         References Cited

U.S. PATENT DOCUMENTS

| | | | |
|---|---|---|---|
| 11,845,343 B2 * | 12/2023 | Aschauer | B60L 5/24 |
| 2002/0086558 A1 * | 7/2002 | Blanvillain | B60L 5/22 |
| | | | 439/32 |
| 2015/0239349 A1 | 8/2015 | Keil | |
| 2016/0257205 A1 * | 9/2016 | Wang | B60L 5/18 |
| 2023/0023500 A1 * | 1/2023 | Zemann | B60L 5/22 |
| 2023/0064169 A1 * | 3/2023 | Saliger | B60L 5/24 |
| 2024/0326601 A1 * | 10/2024 | Flois | B60L 53/35 |
| 2025/0074233 A1 * | 3/2025 | Flois | B60M 7/003 |

FOREIGN PATENT DOCUMENTS

| | | | | |
|---|---|---|---|---|
| CN | 105128680 | | 12/2015 | |
| CN | 205220391 | | 5/2016 | |
| CN | 205220391 U | * | 5/2016 | |
| DE | 249677 | | 9/1987 | |
| EP | 0844131 | | 5/1998 | |
| EP | 1361103 | | 11/2003 | |
| EP | 2644433 | | 10/2013 | |
| WO | 0232714 | | 4/2002 | |
| WO | WO-0232714 A1 | * | 4/2002 | B60L 5/22 |
| WO | 2018150129 | | 8/2018 | |
| WO | WO-2021122375 A1 | * | 6/2021 | B60L 5/22 |

* cited by examiner

ROCKER FOR A CURRENT COLLECTOR OF A VEHICLE

CROSS-REFERENCE TO RELATED APPLICATIONS

This is a U.S. national stage of application No. PCT/EP2020/085765 filed 11 Dec. 2020. Priority is claimed on Austrian Application No. A51102/2019 filed 17 Dec. 2019, the content of which is incorporated herein by reference in its entirety.

BACKGROUND OF THE INVENTION

1. Field of the Invention

The invention relates to a rocker for a current collector of a vehicle, where the rocker includes at least one first contact strip which is connected to a first lever arrangement which is coupled to a first bearing device, and includes a second lever arrangement which is coupled to a second bearing device, where the first bearing device and the second bearing device are connectable in an articulated manner to a current collector linkage.

2. Description of the Related Art

Electrically powered vehicles are often equipped with current collectors (e.g., single-arm or scissors pantographs) via which an electric current is collected from a contact wire or from a conductor rail, and via which electric drives of the vehicles are supplied with electricity.

Strong forces act on a current collector, in particular when a vehicle is traveling at high speeds. These forces are contact forces between contact strips of a rocker of the current collector and the contact wire or conductor rail, on the one hand, and aerodynamic forces resulting from dynamic forces, on the other.

It is therefore important to provide the rocker, which makes contact with the contact wire or conductor rail via one or more contact strips, with effective springing in order to reduce the load on a current collector linkage and avoid contact losses between the current collector and the contact wire or conductor rail.

EP 2 644 433 A2 discloses an exemplary current collector having a current collector linkage and a tiltable rocker which makes contact with a contact wire via contact strips. The current collector linkage comprises an upper arm and a lower arm as well as a pneumatic actuator, carries the rocker and is mounted in an articulated manner on a vehicle. The rocker can be raised and lowered via the actuator.

WO 02/32714 A1 also describes a frame rocker for a current collector of an electric vehicle, where two stiffened frames are connected in an articulated manner to two contact strips. The frames have frame tubes extending in which torsion springs are mounted. The rocker is connected to an apex shaft of the current collector via the torsion springs. In this arrangement, a first torsion spring is coupled to a first end of the apex shaft, while a second torsion spring is connected to a second end of the apex shaft. The torsion springs are connected in a non-rotatable manner via bearing elements to carrier elements that are connected to the apex shaft.

Further, EP 0 844 131 A1 likewise reveals a frame rocker having contact strips for a current collector of an electric vehicle. The contact strips are rigidly connected via U-shaped spring yokes, the arms of which extend transversely to a vehicle longitudinal direction, to carrier elements that are connected to an apex shaft of the current collector.

EP 1 361 103 B1 also discloses a rocker for a current collector of an electric vehicle which is connected to an upper arm of the current collector via lever devices, shafts and springs that are implemented independently of the shafts. The shafts are mounted in carrier tubes, axially and radially supported by bearings. Torques are introduced into the shaft via the lever devices, corresponding reaction torques being produced by the springs, where the springs are connected, on the one hand, to the shafts and, on the other hand, to the carrier tubes.

In their conventional forms, the cited approaches suffer the drawback that the rockers or contact strips possess no marked mobility compared to linkages or upper arms or apex shafts and that there is hardly any compensation for deformations and/or that complicated bearing arrangements, comprising shafts and springs, for example, are provided between the rocker and upper arm.

SUMMARY OF THE INVENTION

It is an object of the present invention to provide a rocker which provides an improvement comparison to the prior art and which is simple in terms of its construction and yet has appropriate load-bearing capacity, including with regard to dynamic loads.

This and other objects and advantages are achieved in accordance with the invention by a rocker in which a first torsion spring is fixedly connected to a lever of the first lever arrangement and is non-rotatably connected via a displaceable bearing to the first bearing device or the first torsion spring is connected non-rotatably via a displaceable bearing to a lever of the first lever arrangement and fixedly to the first bearing device, where the first torsion spring simultaneously forms a torque transmission device and a spring device between the first lever arrangement and the first bearing device.

A particularly lightweight, compact and nonetheless robust and wear-resistant arrangement for collecting current is achieved. as a result. Complicated bearing arrangements between the rocker and the current collector linkage, e.g., shafts encapsulated by coil springs, can be dispensed with. The arrangement in accordance with the invention can be implemented using a small number of components that furthermore have a low level of their complexity.

The first torsion spring simultaneously serves as a torque transmission device and as a spring device. Contact forces transmitted by a contact wire or conductor rail via the first contact strip are introduced into the first torsion spring via the first lever arrangement. The first torsion spring is twisted due to the action of torsional moments present. Corresponding reaction spring forces counteract the effect of the torsional moments present as a result of a corresponding torsion spring stiffness. Loading and unloading processes of the first contact strip as well as of the first lever arrangement are cushioned by springing, thereby achieving a mechanically decoupled rocker bearing.

The first torsion spring is decoupled from forces acting on the rocker in the vehicle longitudinal direction and in the vehicle transverse direction.

The rocker bearing is geared to loads caused by the contact forces and the aerodynamic forces, including high-frequency dynamic loads. Compensation for changes in length of the first torsion spring, e.g., caused by torsion of the first torsion spring, is provided as a result of the displaceable bearing. This has the effect of easing the load on the rocker and damage, in particular in the case of heavy and/or high-frequency loads, is avoided.

It is beneficial if the first torsion spring is positive-locking and pretensioned.

Assembly and disassembly tasks are simplified if the first torsion spring is fixedly connected to a lever of the first lever arrangement. For assembly purposes, the first lever arrangement or a lever of the first lever arrangement must simply be threaded into the first bearing device together with the first torsion spring preinstalled thereon and subsequently connected to the bearing device.

Suspension characteristics tailored to a defined load situation are achieved by pretensioning the first torsion spring.

An advantageous embodiment is obtained if the first bearing device includes a clamping element to which the first torsion spring is connected. A favorable modularity of the rocker bearing is achieved by this measure. This makes it possible, for example, to swap the clamping element subsequently while retaining the first bearing device that is connectable to the current collector linkage in order to replace the first torsion spring with a different torsion spring (e.g., for reasons of wear and tear or on account of a change in the load situation).

It is helpful if the first bearing device has a first housing, where the first torsion spring is arranged inside the first housing. As a result of this measure, the first torsion spring is protected against environmental influences (e.g., humidity and particles).

In order to support a simple and quick replaceability of the clamping element and the first torsion spring and at the same time also to protect the clamping element against environmental influences, it can further be provided that the clamping element is connected in a non-rotatable and detachable manner to the first housing and is arranged inside the first housing.

The simple and quick replaceability of the first torsion spring is further improved if a first mounting device is connected non-rotatably to a lever of the first lever arrangement and rotatably to the first housing, the first torsion spring being connected to the first lever arrangement by way of the first mounting device. The first mounting device therefore serves as an adapter for the first torsion spring, on the one hand, and for the first lever arrangement, on the other.

In an advantageous embodiment, a second contact strip is provided which is connected to a third lever arrangement, which is coupled to the first bearing device, as well as to a fourth lever arrangement, which is coupled to the second bearing device, where a third torsion spring, which simultaneously forms a torque transmission device and a spring device between the third lever arrangement and the first bearing device, is fixedly connected to a lever of the third lever arrangement as well as non-rotatably connected via a displaceable bearing to the first bearing device or non-rotatably connected via a displaceable bearing to a lever of the third lever arrangement as well as fixedly connected to the first bearing device. It is beneficial in this case if the third torsion spring is connected to the clamping element.

Owing to a separation of the first torsion spring and the third torsion spring via the clamping element, the first torsion spring and the third torsion spring can adapt virtually independently of one another to respective load conditions acting on the first contact strip and the second contact strip, as a result of which the rocker in accordance with the invention exhibits a low tendency to overloading or damage caused thereby and also a low tendency to suffer from excessive wear.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to exemplary embodiments, in which.

DETAILED DESCRIPTION OF THE EXEMPLARY EMBODIMENTS

Figure 1:
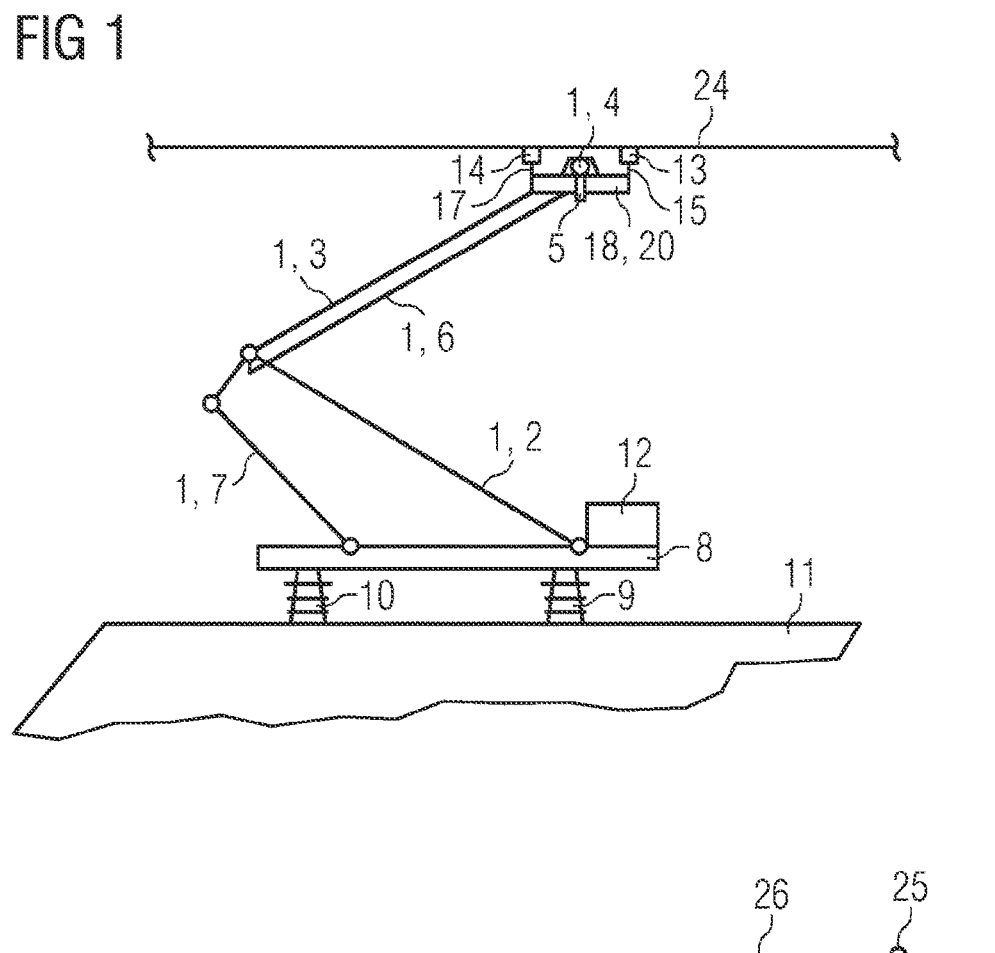
FIG. 1 is a schematic side view of an exemplary current collector in accordance with the invention.

A schematic side view presented in FIG. 1 shows an exemplary current collector having a current collector linkage 1 which comprises a lower arm 2, an upper arm 3, an apex bar 4 having a first pantograph horn 5 and a second pantograph horn (not shown), a parallel guide rod 6 and a coupling rod 7. The lower arm 2 and the coupling rod 7 are connected in an articulated manner to a base frame 8, which is connected via a first post insulator 9, a second post insulator 10 and a third post insulator (not shown) to a roof 11 of a rail vehicle. A pneumatic lift drive 12 for raising and lowering the current collector is provided between the base frame 8 and the lower arm 2.

The upper arm 3 is connected in an articulated manner to the lower arm 2 and also in an articulated manner to the coupling rod 7, while the parallel guide rod 6 is connected in an articulated manner to the lower arm 2.

A rocker in accordance with the invention, which has a first contact strip 13, a second contact strip 14, a first lever arrangement 15, a second lever arrangement 16 (shown in FIG. 2), a third lever arrangement 17 and a fourth lever arrangement (not shown), is mounted onto the current collector linkage 1. The rocker additionally comprises a first bearing device 18 and a second bearing device 19 (shown in FIG. 2) via which the rocker is connected in an articulated manner to the apex rod 4, i.e., to the current collector linkage 1.

Figure 2:
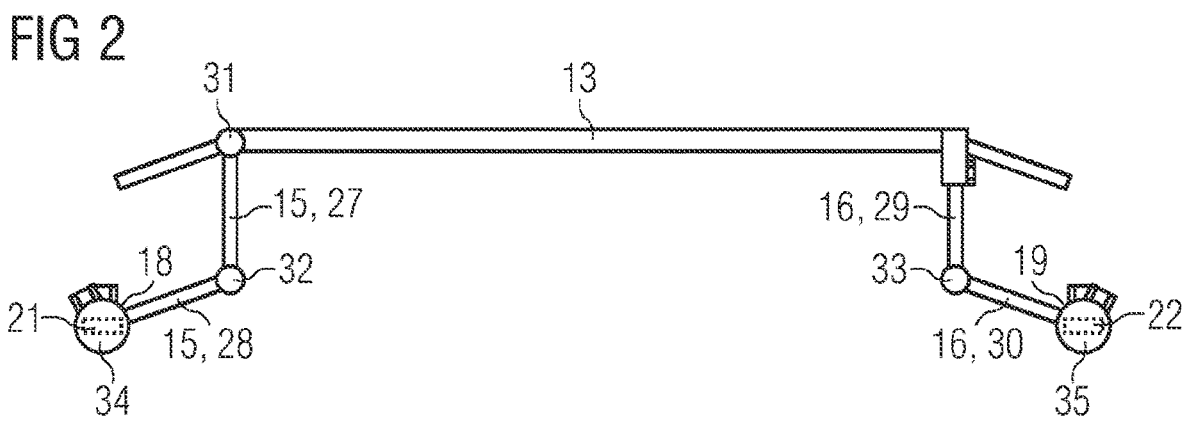
FIG. 2 is a schematic view of an exemplary first embodiment of an inventive rocker in a first side view, where a first contact strip is shown.
Figure 3:
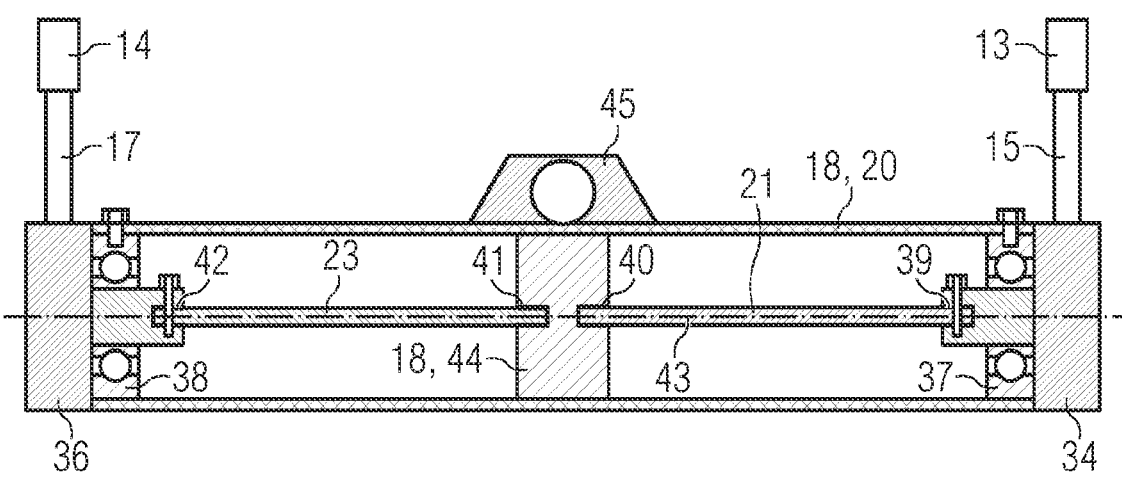
FIG. 3 is a schematic cutaway view of the exemplary first embodiment of an inventive rocker in a second side view, where a first contact strip and a second contact strip are shown and where torsion spring elements are connected via displaceable bearings to a clamping element.

Arranged inside a first housing 20 of the first bearing device 18 and a second housing of the second bearing device 19 are a first torsion spring 21 and a second torsion spring 22, which are shown in FIG. 2, a third torsion spring 23, which is shown in FIG. 3, and a fourth torsion spring (not shown), which connects the first lever arrangement 15, the second lever arrangement 16, the third lever arrangement 17 and the fourth lever arrangement to one another, on the one hand, and the first bearing device 18 and the second bearing device 19, on the other hand.

The rocker is also connected in an articulated manner to the parallel guide rod 6 and inter-engages via the first contact strip 13 and the second contact strip 14, which comprise carbon slip pieces (not shown) known from the prior art, with a contact wire 24, as a result of which the rail vehicle is supplied with electricity.

The first contact strip 13 and the second contact strip 14 are aligned parallel to a vehicle transverse axis 25, which appears as projecting in FIG. 1. The first bearing device 18 and the second bearing device 19 are aligned parallel to a vehicle longitudinal axis 26, i.e., are rotated through 90° with respect to the first contact strip 13 and the second contact strip 14 as a result of the first lever arrangement 15, the second lever arrangement 16, the third lever arrangement 17 and the fourth lever arrangement.

An exemplary first embodiment of a rocker in accordance with the invention is disclosed in FIG. 2 in a schematic first side view.

The rocker is provided for a current collector of a rail vehicle, as shown by way of example in FIG. 1, and comprises a first contact strip 13 and a second contact strip 14 as shown in FIG. 1 and FIG. 3.

The rocker additionally has a first lever arrangement 15, a second lever arrangement 16, a third lever arrangement 17 (shown in FIG. 3) and a fourth lever arrangement (not shown). In addition, the rocker comprises a first bearing device 18 and a second bearing device 19, which are coupled to the first lever arrangement 15, the second lever arrangement 16, the third lever arrangement 17 and the fourth lever arrangement. The first lever arrangement 15 has a first lever 27 and a second lever 28, the second lever arrangement 16 a third lever 29 and a fourth lever 30.

The first lever 27 is connected via a first revolute joint 31 to the first contact strip 13, the second lever 28 via a second revolute joint 32 to the first lever 27. The second lever 28 is furthermore fixedly connected, i.e., in an immovable and non-rotatable manner, via a screwed connection to a first mounting device 34, the latter in turn being rotatably connected to a first housing 20 (shown in FIG. 3) of the first bearing device 18.

The third lever 29 is fixedly connected via a screwed connection to the first contact strip 13, the fourth lever 30 via a third revolute joint 33 to the third lever 29. The fourth lever 30 is also fixedly connected to a second mounting device 35, the latter in turn being rotatably connected to a second housing (not shown) of the second bearing device 19.

The second contact strip 14 of the current collector is connected via the third lever arrangement 17 and via a third mounting device 36 (shown in FIG. 3) to the first bearing device 18, as well as via the fourth lever arrangement and a fourth mounting device (not shown) to the second bearing device 19.

In terms of their arrangement relative to one another as well as in terms of their construction, the second contact strip 14, the third lever arrangement 17, the fourth lever arrangement, the third mounting device 36 and the fourth mounting device are implemented in an identical manner to the first contact strip 13, the first lever arrangement 15, the second lever arrangement 16, the first mounting device 34 and the second mounting device 35, though with respect to the first contact strip 13, the first lever arrangement 15, the second lever arrangement 16, the first mounting device 34 and the second mounting device 35, they are connected to the first housing 20 and the second housing rotated through 180°.

A first torsion spring 21 is provided inside the first housing 20 and is fixedly connected via a screwed connection to the first mounting device 34, and thus fixedly connected to the second lever 28 of the first lever arrangement 15.

A second torsion spring 22 is provided inside the second housing and is fixedly connected via a screwed connection to the second mounting device 35, and thus to the fourth lever 30 of the second lever arrangement 16.

A third torsion spring 23 (shown in FIG. 3) also arranged in the first housing 20 is attached via a screwed connection to the third mounting device 36 and is thus fixedly connected to a lever of the third lever arrangement 17.

A fourth torsion spring (not shown) also arranged in the second housing is attached via a screwed connection to the fourth mounting device and is thus fixedly connected to a lever of the fourth lever arrangement.

The first torsion spring 21, the second torsion spring 22, the third torsion spring 23 and the fourth torsion spring have rectangular cross-sections.

The first torsion spring 21 and the third torsion spring 23 are non-rotatably connected to the first bearing device 18 by way of displaceable bearings, and the second torsion spring 22 and the fourth torsion spring are non-rotatably connected to the second bearing device 19 by way of displaceable bearings. This is described by way of example with reference to the first torsion spring 21 and the third torsion spring 23 in connection with FIG. 3.

The first torsion spring 21, the second torsion spring 22, the third torsion spring 23 and the fourth torsion spring are twisted under loading due to their fixed and non-rotatable bearings.

The first torsion spring 21, the second torsion spring 22, the third torsion spring 23 and the fourth torsion spring are at the same time (simultaneously form) torque transmission devices and spring devices between the first lever arrangement 15, the second lever arrangement 16, the third lever arrangement 17 and the fourth lever arrangement on the one hand, and the first bearing device 18 and the second bearing device 19 on the other.

FIG. 3 shows a schematic view of the same exemplary first embodiment of an inventive rocker of a current collector of a rail vehicle as is also shown in FIG. 1 and FIG. 2. The same reference designators are therefore used in some cases.

In contrast to FIG. 2, which shows a first side view of the rocker, FIG. 3 shows a cutaway second side view of the rocker which discloses a view of the rocker rotated through 90° with respect to the first side view.

The rocker comprises a first contact strip 13, a second contact strip 14, a first lever arrangement 15, a second lever arrangement 16 (shown in FIG. 2), a third lever arrangement 17, a fourth lever arrangement (not shown), a first bearing device 18 and a second bearing device 19 (shown in FIG. 2), which are connected to a first mounting device 34, a second mounting device 35 (shown in FIG. 2), a third mounting device 36 and a fourth mounting device (not shown).

A first torsion spring 21 is connected to the first mounting device 34, a second torsion spring 22 (shown in FIG. 2) to the second mounting device 35, a third torsion spring 23 to the third mounting device 36, and a fourth torsion spring (not shown) to the fourth mounting device.

The first contact strip 13 is connected to the first mounting device 34 via the first lever arrangement 15, the first lever arrangement 15 and the first mounting device 34 being attached to one another via a screwed connection. The first mounting device 34 is rotatably connected to a hollow-cylindrical first housing 20 of the first bearing device 18 via a first roller bearing 37. The first housing 20 is implemented in a fiber-reinforced composite material and serves as a rocker box. The first roller bearing 37 is attached to the first housing 20 by means of a screwed connection.

In accordance with the invention, it is also conceivable that the first housing 20 is implemented in a metallic material. On its front face the first mounting device 34 has a first groove 39 into which a first end of the first torsion spring 21 implemented in spring steel is clamped into place and fixed via a screwed connection.

In accordance with the invention, it is also conceivable to implement the first torsion spring 21 in a fiber-reinforced composite material, for example.

The first torsion spring 21 has a rectangular cross-section and is mounted via its second end in a non-rotatable, positive-locking and displaceable manner in the direction of its longitudinal axis 43 as well as in the direction of a longitudinal extension of the first contact strip 13, i.e., in the direction of a width of the first torsion spring 21 or, as the case may be, in a direction transverse to the longitudinal axis 43, in a second groove 40 of a metallic, cylindrical clamping element 44 associated with the first bearing device 18. A height of the rectangular cross-section of the first torsion spring 21 is small in relation to a length of the first torsion spring 21.

The second groove 40 is milled out on a first front face of the clamping element 44. A corresponding mechanical machining of the clamping element 44 in the region of the second groove 40 enables the first torsion spring 21 to slide into and out of the second groove 40 with minimal resistance.

The first torsion spring 21 is pre-tensioned following connection of the first mounting device 34 to the first housing 20.

It is therefore possible that mechanical stresses in the first torsion spring 21, i.e., a mechanical loading of the first torsion spring 21, are relieved, as a result of which the first torsion spring 21 is subject to a reduced load on the one hand and on the other hand reacts flexibly to loads caused by contact forces between the first contact strip 13 and a contact wire 24 (shown in FIG. 1).

The clamping element 44 is connected to the first housing 20, i.e., to the first bearing device 18, via conventional fasteners (not shown in FIG. 3) via a screwed connection, i.e., detachably. The fasteners are connected to the clamping element 44 via corresponding recesses (likewise not shown) in the first housing 20.

Owing to the screwed connection fixing the clamping element 44 to the first bearing device 18 and the non-rotatable, displaceable mounting of the first torsion spring 21 in the clamping element 44, the first torsion spring 21 is connected to the first bearing device 18 in a non-rotatable and displaceable manner.

A third groove 41, via which the third torsion spring 23 is connected in a non-rotatable and displaceable manner to the first bearing device 18, is provided on a second front face of the clamping element 44. The third torsion spring 23 is further connected to a third mounting device 36 via a clamping action into a fourth groove 42, which is provided on the front face in the third mounting device 36, and via a screwed connection. In terms of material, geometry and connection technology for attachment to the clamping element 44 and to the third mounting device 36 as well as in terms of orientation, the third torsion spring 23 is implemented in the same way as the first torsion spring 21.

The third torsion spring 23 has the same longitudinal axis 43 as the first torsion spring 21.

The first torsion spring 21, the third torsion spring 23 and the clamping element 44 are arranged inside the first housing 20.

A housing longitudinal axis of the first housing 20 and the longitudinal axis 43 of the first torsion spring 21 and of the third torsion spring 23 extend into one another.

In accordance with the invention, it is also conceivable to dispense with the third torsion spring 23 and to connect the first torsion spring 21 to the first mounting device 34 and to the third mounting device 36.

The third mounting device 36 is rotatably connected to the first housing 20, i.e., to the first bearing device 18, via a second roller bearing 38 which, like the first roller bearing 37, is attached to the first housing 20 via of a screwed connection.

The third lever arrangement 17 is attached to the third mounting device 36 via a screwed connection. The third lever arrangement 17 is in turn connected to the second contact strip 14.

The first housing 20 is attached via a screwed connection to a retaining element 45 of the first bearing device 18 via conventional fasteners (not shown).

The first bearing device 18 is connected via the retaining element 45 in an articulated manner to a first apex rod end of an apex rod 4 (shown in FIG. 1) of the current collector, i.e., to a current collector linkage 1.

In terms of its construction and with respect to its connection to the apex rod 4, the second bearing device 19 is implemented in the same way as the first bearing device 18. The second bearing device 19 is connected in an articulated manner to a second apex rod end of the apex rod 4.

In terms of its construction and functionality, the second housing and its housing contents, comprising the second torsion spring 22 and the fourth torsion spring, are implemented in the same way as the first housing 20 and its housing contents.

The second housing is arranged and aligned parallel to the first housing 20.

No stiffening frames, for example, are provided between the first lever arrangement 15 and the third lever arrangement 17 or between the second lever arrangement 16 and the fourth lever arrangement. The rocker in accordance with the invention is formed as a frameless rocker or as a rocker having individually sprung contact strips.

Figure 4:
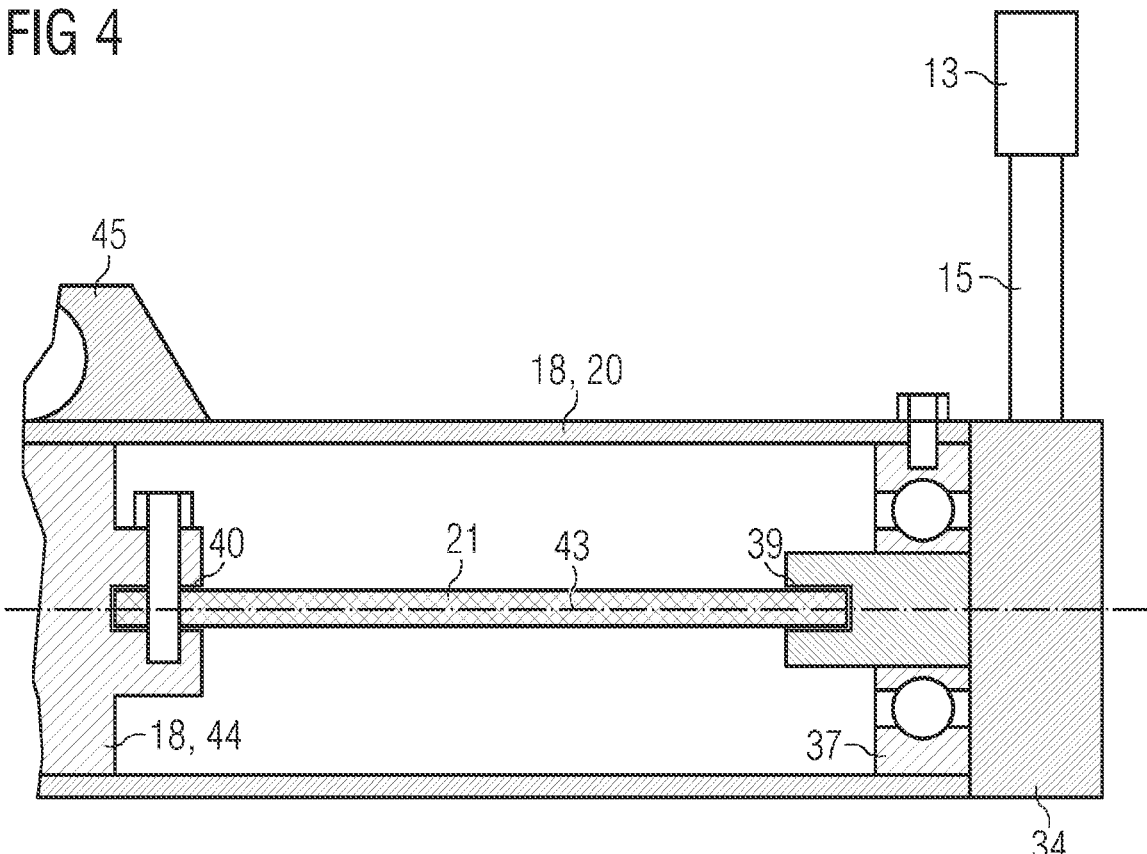
FIG. 4 is a schematic cutaway view of a detail from an exemplary second embodiment of an inventive rocker in a side view, where a first contact strip and a second contact strip are shown and where torsion spring elements are connected to lever arrangements via displaceable bearings.

FIG. 4 schematically shows a detail from an exemplary second embodiment of an inventive rocker of a current collector of a rail vehicle in a cutaway side view.

The exemplary second embodiment of the inventive rocker is similar to the exemplary first embodiment which is shown by way of example in FIG. 3. The same reference designators as in FIG. 3 are therefore used in some cases in FIG. 4.

In contrast to FIG. 3, FIG. 4 shows a rocker in which a first torsion spring 21 is connected non-rotatably via a displaceable bearing to a lever of a first lever arrangement 15 as well as fixedly to a first bearing device 18. Further torsion springs that are not shown are connected in the same way to further lever arrangements (not shown) and a further bearing device (likewise not shown).

The first bearing device 18 and the further bearing device have a first housing 20 and a further housing which, in contrast to the exemplary first embodiment of a rocker in accordance with disclosed embodiments of the invention, are implemented in a metallic material.

In contrast to FIG. 3, the first torsion spring 21 shown in FIG. 4 and the further torsion springs that are not shown are implemented in a fiber-reinforced composite material.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rocker for a current collector of a vehicle, comprising:
   a first bearing device including a first housing and a clamping element;
   a first lever arrangement coupled to the first bearing device;
   a second bearing device including a second housing and a second clamping element;
   a second lever arrangement coupled to the second bearing device;
   at least one first contact strip connected to the first lever arrangement and connected to the second lever arrangement; and
   a first torsion spring arranged inside the first housing, attached to the clamping element and one of (i) fixedly connected to a lever of the first lever arrangement and non-rotatably connected via a displaceable bearing to the first bearing device and (ii) non-rotatably connected via a displaceable bearing to a lever of the first lever arrangement and fixedly connected to the first bearing device;
   wherein the first torsion spring simultaneously forms a torque transmission device and a spring device between the first lever arrangement and the first bearing device.

2. The rocker as claimed in claim 1, wherein the first torsion spring is displaceable in a region of the displaceable bearing in a direction of a longitudinal axis of the first torsion spring.

3. The rocker as claimed in claim 2, wherein the first torsion spring is displaceable in the region of the displaceable bearing transversely to the longitudinal axis.

4. The rocker as claimed in claim 1, wherein the first torsion spring is displaceable in a region of the displaceable bearing transversely to the longitudinal axis.

5. The rocker as claimed in claim 1, characterized in that the first torsion spring is displaceable in a region of the displaceable bearing in a direction of a width of the first torsion spring.

6. The rocker as claimed in claim 1, wherein the first torsion spring is displaceable in a region of a displaceable bearing in a direction of a longitudinal extension of the at least first contact strip.

7. The rocker as claimed in claim 1, wherein the first torsion spring is mounted in a positive-locking and pre-tensioned manner.

8. The rocker as claimed in claim 1, wherein the first torsion spring has a rectangular cross-section.

9. The rocker as claimed in claim 1, wherein the first torsion spring is implemented in a fiber-reinforced composite material.

10. The rocker as claimed in claim 1, wherein the clamping element is connected in a non-rotatable and detachable manner to the first housing and is arranged inside the first housing.

11. The rocker as claimed in claim 10, further comprising:
   a first mounting device non-rotatably connected to a lever of the first lever arrangement and rotatably connected to the first housing;
   wherein the first torsion spring is connected to the first lever arrangement via the first mounting device.

12. The rocker as claimed in claim 1, further comprising:
   a first mounting device non-rotatably connected to a lever of the first lever arrangement and rotatably connected to the first housing;
   wherein the first torsion spring is connected to the first lever arrangement via the first mounting device.

13. The rocker as claimed in claim 1, wherein the first housing is implemented in a fiber-reinforced composite material.

14. The rocker as claimed in claim 1, further comprising:
   a second torsion spring arranged inside the second housing, attached to the second clamping element and one of (i) fixedly connected to a lever of the second lever arrangement and non-rotatably connected via a displaceable bearing to the second bearing device and (ii) non-rotatably connected via a displaceable bearing to a lever of the second lever arrangement and fixedly connected to the second bearing device;
   wherein the second torsion spring simultaneously forms a torque transmission device and a spring device between the second lever arrangement and the second bearing device.

15. The rocker as claimed in claim 14, wherein one of (i) the second torsion spring and (ii) a fourth torsion spring, which simultaneously form a torque transmission device and a spring device between the fourth lever arrangement and the second bearing device, is one of (i) fixedly connected to a lever of the fourth lever arrangement and non-rotatably connected via a displaceable bearing to the second bearing device and (ii) non-rotatably connected via a displaceable bearing to a lever of the fourth lever arrangement and fixedly connected to the second bearing device.

16. The rocker as claimed in claim 1, further comprising:
   a third lever arrangement coupled to the first bearing device;
   a fourth lever arrangement coupled to the second bearing device; and
   a second contact strip connected to the third lever arrangement and the fourth lever arrangement;
   wherein the first torsion spring is non-rotatably connected to a lever of the third lever arrangement.

17. The rocker as claimed in claim 1, further comprising:
   a third lever arrangement coupled to the first bearing device;
   a fourth lever arrangement coupled to the second bearing device;
   a second contact strip connected to the third lever arrangement and the fourth lever arrangement;

a third torsion spring which simultaneously forms a torque transmission device and a spring device between the third lever arrangement and the first bearing device, wherein the third torsion spring is arranged inside the first housing and one of (i) fixedly connected to a lever of the third lever arrangement and non-rotatably connected via a displaceable bearing to the first bearing device and (ii) non-rotatably connected via a displaceable bearing to a lever of the third lever arrangement and fixedly connected to the first bearing device.

18. The rocker as claimed in claim 17, wherein the third torsion spring is connected to the clamping element.

19. A current collector having the rocker as claimed in claim 1.

20. A vehicle having the current collector as claimed in claim 19.

\*    \*    \*    \*    \*